(12) United States Patent
Bohl et al.

(10) Patent No.: US 9,803,786 B2
(45) Date of Patent: Oct. 31, 2017

(54) PRESS FITTING FOR A PIPE, IN PARTICULAR PLASTIC PIPE OR PLASTIC AND METAL COMPOSITE PIPE

(75) Inventors: Marcus Bohl, Hirschaid (DE); Bernd Kaufmann, Hassfurt (DE); Thomas Kern-Emmerich, Niederwerrn (DE)

(73) Assignee: Uponor Innovation AB, Virsbo (SE)

( * ) Notice: Subject to any disclaimer, the term of this patent is extended or adjusted under 35 U.S.C. 154(b) by 2137 days.

(21) Appl. No.: 12/671,421

(22) PCT Filed: Jun. 4, 2008

(86) PCT No.: PCT/EP2008/056884
§ 371 (c)(1),
(2), (4) Date: Jun. 9, 2010

(87) PCT Pub. No.: WO2009/015927
PCT Pub. Date: Feb. 5, 2009

(65) Prior Publication Data
US 2010/0259039 A1    Oct. 14, 2010

(30) Foreign Application Priority Data
Jul. 31, 2007  (DE) .................. 10 2007 035 933

(51) Int. Cl.
*F16L 33/00*     (2006.01)
*F16L 33/207*    (2006.01)
*F16L 13/14*     (2006.01)

(52) U.S. Cl.
CPC ......... *F16L 33/2078* (2013.01); *F16L 13/141* (2013.01); *F16L 2201/10* (2013.01)

(58) Field of Classification Search
CPC .. F16L 13/141; F16L 33/2078; F16L 2201/10
(Continued)

(56) References Cited

U.S. PATENT DOCUMENTS 3,929,357 A   12/1975  DeVincent
4,923,350 A    5/1990  Hinksman et al.
(Continued)

FOREIGN PATENT DOCUMENTS

DE    3872974    2/1993
DE    4231623    3/1994
(Continued)

OTHER PUBLICATIONS

Bernhard et al. (EP1790896),: Press Fitting for a Pipe May 30, 2007 (English Translation of the Description) [online]. Espacenet [retrieved on May 4, 2015]. Retrieved from <URL: http://worldwide.espacenet.com/publicationDetails/biblio?DB=EPODOC &II=0&ND=3&adjacent=true&locale=en_EP&FT=D &date=20070530&CC=EP&NR=1790896A1&KC=A1>.*

*Primary Examiner* — Matthieu F Setliff
*Assistant Examiner* — James A Linford
(74) *Attorney, Agent, or Firm* — Occhiuti & Rohlicek LLP

(57) ABSTRACT

The press fitting for a pipe, is provided with a fitting body which has a supporting sleeve with a free end and a pressing sleeve. The pressing sleeve is held substantially concentrically with respect to the supporting sleeve by means of at least one spacer element arranged at the holding end of the pressing sleeve. I the region of the holding end of the pressing sleeve, the fitting body has a locking depression or a locking projection. At the holding end, the cylindrical wall of the pressing sleeve has at least one opening through which a locking element extends to the axial fitting of the pressing sleeve to the fitting body, wherein the locking element projects into the locking depression of the fitting body and ends in the depression, or the locking element engages around or behind the locking projection of the fitting body.

1 Claim, 1 Drawing Sheet

(58) Field of Classification Search
USPC .................................................. 285/242, 256
See application file for complete search history.

(56) References Cited

U.S. PATENT DOCUMENTS

| | | |
|---|---|---|
| 5,269,566 A | 12/1993 | Do |
| 5,378,024 A | 1/1995 | Kumagai |
| 5,876,071 A | 3/1999 | Aldridge |
| 2008/0258464 A1 | 10/2008 | Kaufmann et al. |
| 2009/0218814 A1 | 9/2009 | Kern et al. |

FOREIGN PATENT DOCUMENTS

| | | |
|---|---|---|
| DE | 4304680 | 4/1994 |
| DE | 29503019 | 5/1995 |
| DE | 19603228 | 7/1997 |
| DE | 29713845 | 11/1997 |
| DE | 19735919 | 11/1998 |
| DE | 29822752 | 4/1999 |
| DE | 10010573 | 3/2001 |
| DE | 19856999 | 6/2001 |
| DE | 10137078 | 1/2003 |
| DE | 10134727 | 2/2003 |
| DE | 10152975 | 4/2003 |
| DE | 10233559 | 1/2004 |
| DE | 102005028558 | 4/2007 |
| DE | 102007008759 | 6/2008 |
| EP | 0444304 | 9/1991 |
| EP | 0621432 | 10/1994 |
| EP | 0728979 | 8/1996 |
| EP | 0940620 | 9/1999 |
| EP | 0942219 | 9/1999 |
| EP | 1538383 | 6/2005 |
| EP | 1790896 | 5/2007 |
| EP | 1790896 A1 * | 5/2007 |

* cited by examiner

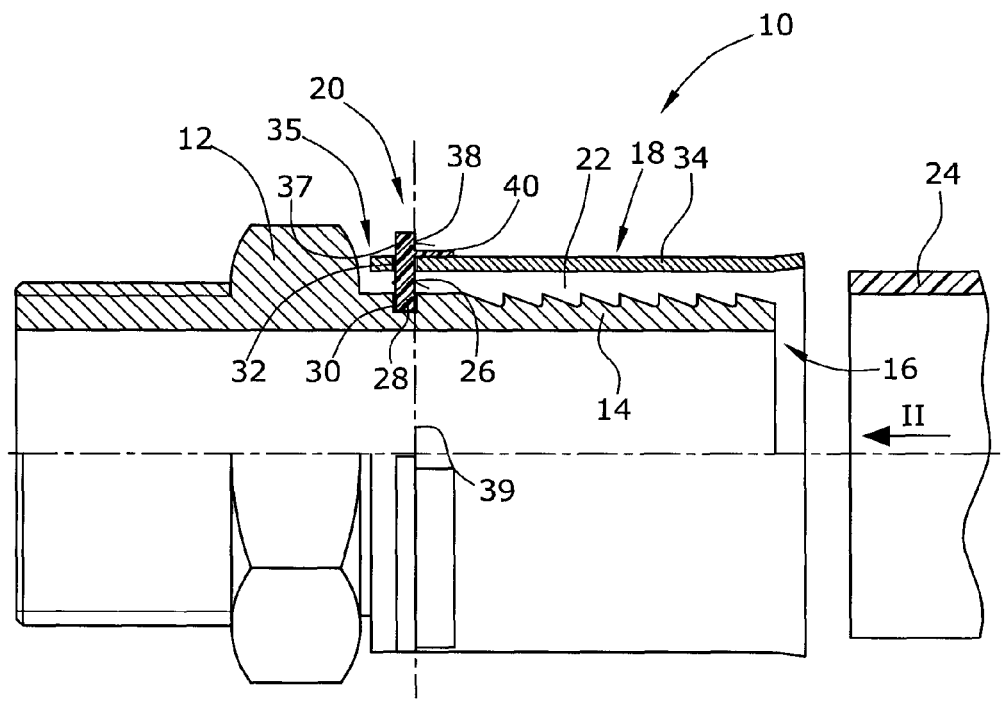
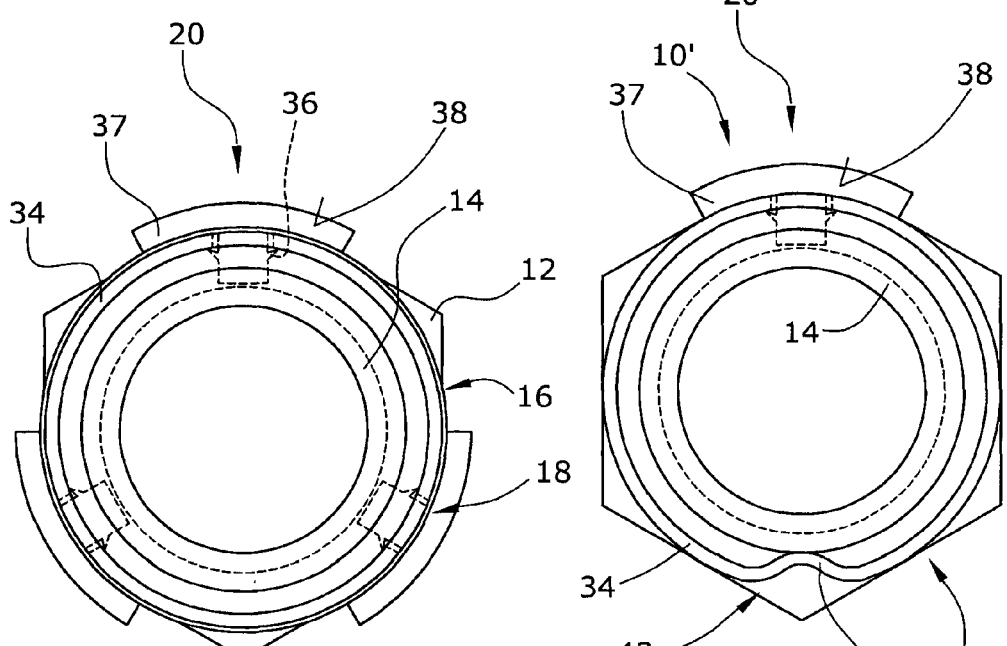

PRESS FITTING FOR A PIPE, IN PARTICULAR PLASTIC PIPE OR PLASTIC AND METAL COMPOSITE PIPE

CROSS-REFERENCE TO RELATED APPLICATIONS

This application is the National Stage of International Application No. PCT/EP2008/056884, filed on Jun. 4, 2008, which claims the priority of German Patent Application No. 10 2007 035 933.2, filed on Jul. 31, 2007. The contents of both applications are hereby incorporated by reference in their entirety.

BACKGROUND OF THE INVENTION

The invention relates to a press fitting for a pipe and, in particular, to a press fitting for a plastic pipe or plastic-metal composite pipe.

Such press fittings are basically known. They have a fitting body, with a supporting sleeve projecting from this body. The end of a pipe to be connected is pushed onto the supporting sleeve, whereupon a pressing sleeve is pressed onto the pushed-on pipe end from the outside. This pressing sleeve is preassembled to simplify assembly on the fitting body and consequently runs essentially concentric to the supporting sleeve.

Examples for the previously described type of press fitting are found in DE-A-42 31 623, DE-A-196 03 228, and DE-C-100 10 573.

For the press fittings that are described in the previously mentioned publications, the pressing sleeve is held directly on the fitting body. For this purposed, the fitting bodies have collars on which one end of the pressing sleeve is pushed. Alternatively, the fitting bodies could have axially oriented grooves with circumferential walls that surround the pressing sleeves from the outside (DE-A-42 31 623). In particular, fitting bodies for the connection of pipes with relatively large diameters require a not insignificant use of materials for the direct mounting of the pressing sleeves on the fitting bodies, because the collars or circumferential walls on which the pressing sleeves are held can also be considerable in their extent.

It is further known to fix pressing sleeves of press fittings by means of retaining rings made from plastic on the fitting bodies. Such press fittings are described in DE-U-295 03 019, DE-C-43 04 680, DE-C-198 56 999, DE-A-101 34 727, DE-B-102 33 559, EP-A-0 728 979, and EP-A-0 942 219. In the case of these known press fittings, the material consumption for the retaining ring is also not insignificant in the case of press fittings with relatively large diameters.

From DE-C-101 37 078 it is known, in the case of a press fitting, to secure the pressing sleeve on the fitting body against detachment by the engaging of an inner bead on the retaining end of the pressing sleeve behind an outer bead on the fitting body.

BRIEF SUMMARY OF THE INVENTION

The problem of the invention is to create a press fitting for a pipe, in particular, a plastic pipe or plastic-metal composite pipe that has a preassembled pressing sleeve, wherein the material consumption for holding the pressing sleeve is reduced and the preassembly of the pressing sleeve is simplified.

For solving this problem, a press fitting for a pipe, in particular, for a plastic pipe or plastic-metal composite pipe, is proposed with the invention, wherein the press fitting is provided with
- a fitting body that has a supporting sleeve with a free end over which one end of a pipe to be connected can be pushed onto the supporting sleeve, and
- a pressing sleeve that can be deformed plastically for pressing against one end of a pipe pushed onto the supporting sleeve and that has an axial holding end, turned away from the free end of the supporting sleeve, at which the pressing sleeve is held on the fitting body.

In the case of this press fitting, it is proposed according to the invention that
- the pressing sleeve is held essentially concentric to the supporting sleeve by means of at least one spacer element arranged at its holding end,
- the fitting body has, in the area of the holding end of the pressing sleeve, a locking recess or a locking projection, and
- the cylindrical walls of the pressing sleeve have, at the holding end, at least one opening through which a locking element extends for the axial fixation of the pressing sleeve on the fitting body,
- wherein the locking element projects into the locking recess of the fitting body and ends in this recess, or the locking element engages around or behind the locking projection of the fitting body.

In the case of the press fitting according to the invention, the pressing sleeve is held on the fitting body essentially concentric to the supporting sleeve, that is, with the help of at least one spacer element. Preferably there are several of these spacer elements. In addition to the one or more spacer elements, the press fitting according to the invention also has at least one locking element that is used for the axial fixation of the pressing sleeve on the fitting body. For this purpose, the locking element extends according to the invention through an opening in the cylindrical walls of the pressing sleeve at its holding end and projects into the locking recess on the fitting body. The locking element is thus installed through simple radial insertion in the pressing sleeve of the press fitting. The axial fitting is realized by means of the interaction of the locking element with the locking recess in the fitting body. According to the principle of kinematic reversal, this concept also comprises press fittings in which the locking element engages around or behind a locking projection that is constructed on the fitting body. In both cases, this leads to axial fixation and locking of the pressing sleeve through radial insertion of a locking element.

The locking element and the spacer element, respectively, preferably consists of a plastic material. Either the locking element or the spacer element or both elements are also used for limiting the pipe insertion into the press fitting and thus come into contact with the end face of the pipe end to be connected. If the pipe involves a plastic-metal composite pipe or also a metal pipe, the construction of the previously mentioned elements made from plastic or with a plastic coating with respect to galvanic separation of the metal lining of the pipe vis-à-vis the material of the fitting body, which is normally metallic, is advantageous.

The recess formed in the fitting body for holding the locking element is preferably constructed as a circumferential groove in the fitting body and advantageously in its supporting sleeve. Alternatively, a circumferential rib could also be constructed on the fitting body instead of the circumferential recess, with this rib then being engaged by the locking element or the locking elements.

The spacer element advantageously involves an element that is supported between the pressing sleeve or its walls and the fitting body. It is not necessary to use the spacer element as well for the axial fixation of the pressing sleeve. If this additional function is imparted to the spacer element, then it is to be considered as a locking element in the sense of the invention. Such a locking element having such a spacer function is preferably supported on the base of the locking recess (or on the locking projection), so that the pressing sleeve is fixed with respect to the radial plane.

In the previously described case, the spacer and locking element, preferably made from plastic material, can also advantageously take over, in addition to these functions, the function of the contact for guiding the pressing tool and the function of the galvanic separation of the connected pipe (if this is made from metal or has a metal coating) vis-à-vis to the fitting body (which is normally also made from a metal alloy or has metallic material), wherein, in addition, it could also be provided that the (spacer and locking) element is also used for indicating compression, in that at least one part of the element is broken or visibly destroyed/damaged due to the action of the pressing tool on the pressing sleeve.

Advantageously, the press fitting comprises three locking elements that all project into a circumferential recess constructed in the fitting body and are supported against its base.

Alternatively, it is possible that the spacer element is held on the pressing sleeve differently from the locking element. Thus, it would be possible, for example, that the spacer element is arranged as a pure distance element in the intermediate space between the pressing sleeve and the fitting body. Furthermore, it is conceivable that the spacer element is constructed as an area of the pressing sleeve deformed inward. Here, for example, an inward angled tab or the like or a corrugation-shaped recess of the wall of the pressing sleeve is provided. The spacer element is preferably supported on the fitting body or the supporting sleeve independent of its construction on the outside. If the supporting sleeve or the fitting body is provided with the circumferential recess, then the spacer element could be constructed more widely than the circumferential groove, in order to be supported on this.

If the spacer element has metal (for example, because it is constructed as part of the normally metallic pressing sleeve), it is advantageous for the spacer element to be located, with respect to the free end of the supporting sleeve, farther from this than the spacer or locking element having plastic against which the pipe end makes contact when it is pushed into the press fitting. This relative arrangement is preferable with respect to the fact that, when using a plastic-metal composite pipe, the metal insert of the pipe is then not in contact with a metallic material of the press fitting.

In an advantageous refinement of the invention, it is proposed to construct a tab, arranged on the outside against the walls of the pressing sleeve, on the locking element and/or on the spacer element, wherein this tab projects into a pressing-tool contact area of the pressing sleeve. The pressing tool lies within this contact area when the pressing sleeve is compressed. Thus, the pressing tool acts on the tab, wherein this is severed from the locking element or spacer element when the pressing sleeve is compressed, which is used, in turn, for visually indicating compression.

The fastener construction according to the invention for fixing the pressing sleeve on the fitting body no longer extends over 360°, as in known holding rings or similar holding beads. Instead, it is proposed according to the invention to use only individual locking or spacer elements (for example, three such elements distributed uniformly over the circumference). Between these elements there are intermediate spaces that allow viewing the holding end of the pressing sleeve and that are thus used for inspecting the position or the insertion depth of the pipe end to be connected.

Therefore, because a completely closed ring is not needed for holding the pressing sleeve, but only individual ring sections (in the form of locking or spacer elements) that extend over only a relatively small circumferential angle of a few degrees (for example, 10° to 15°), the material costs for the pressing sleeve fastener are negligibly small, which has an especially advantageous effect in the case of nominal pipe widths greater than 40 mm and in the case of press fittings that are provided for connecting several pipes (for example, normal couplings or T-pieces).

The advantages of the construction according to the invention can be summarized as follows:
- The realization of a sleeve mounting that needs no additional stops or additional sleeve mountings on the fitting body; therefore the profile outer diameter of the fitting body exclusively determines the diameter of its (pipe) outlets. This brings about a significant material savings.
- The invention could be used both for stainless-steel sleeves and also for aluminum sleeves, as well as for all other sleeve materials.
- The sleeve mounting could be made from a material that is independent of the fitting body material (for example, plastic).
- The locking or spacer element could also be used as a stop for the pressing tool (multifunctional element).

BRIEF DESCRIPTION OF THE DRAWINGS

The invention will be explained in more detail below using two embodiments with reference to the drawing. Shown in detail are:

FIG. 1, a half section through a press fitting with pressing sleeve held by individual holding elements in the preassembled state, FIG. 2, a view of the press fitting according to FIG. 1 in the direction of the arrow II, and FIG. 3, a view of an alternative embodiment of a press fitting, likewise according to the arrow II of FIG. 1.

DETAILED DESCRIPTION OF THE INVENTION

In FIG. 1, a press fitting 10 according to one embodiment of the invention is shown in half section. The press fitting 10 has a fitting body 12 made from metal or plastic that has a supporting sleeve 14. The supporting sleeve 14 projects from the remaining part of the fitting body 12 and has a free end 16. Concentric to the supporting sleeve 14 there is a pressing sleeve 18 that can be permanently deformed plastically and that is made, for example, from metal and that is held and fixed, in this embodiment, by three locking/spacer elements 20 made, for example, from plastic, on the fitting body 12 or the supporting sleeve 14. The end of a plastic pipe or plastic-metal composite pipe 24 is pushed into the annular space 22 formed between the supporting sleeve 14 and the pressing sleeve 18, until it contacts, for example, contact faces 26 that are constructed on the elements 20 and that define the maximum insertion depth of the pipe into the annular space 22. As a rule, the supporting sleeve 14 is profiled, and could have a sealing element (e.g., an O-ring).

The special feature of the press fitting 10 consists of holding of the pressing sleeve 18 by only a few locking/spacer elements 20, and especially by a holding system that has no circumferential ring members. In this way, material savings are realized that could be especially noticeable for press fittings for large pipe diameters. In the embodiment of FIGS. 1 and 2, each element 20 has a locking projection 28, wherein all of the projections 28 are immersed in a circumferential (clamping) groove 30 of the fitting body 12 or in its supporting sleeve 14. The elements 20 extend through openings 32 in the walls 34 of the pressing sleeves 18 at their holding ends 35 and have fixing hooks 36 or the like that are used for securing the elements 20 on the pressing sleeve 18.

FIG. 2 shows the arrangement of the locking/spacer elements 20. In this embodiment there are three elements 20, each offset by 120° relative to the others. Free spaces are formed between the elements 20 that could be used to check whether the pipe end pushed into the annular space 22 is pushed in far enough. The elements 20 have arcuate sections 37 that form the ring sections contacting or arranged on the outside on the walls 34 of the pressing sleeve 18.

As shown in FIG. 1, the elements 20 have contact faces 38 aligned with each other in the circumferential direction of the pressing sleeve 18. All of the contact faces 38 lie in a common radial plane 39 and are used for the (axial) contact by a pressing tool (not shown) that can be oriented according to specifications for the press fitting 10, in order to generate standard compression. The elements 20 are furthermore provided with tabs 40 that are gripped by the pressing tool (not shown) during compression and are severed from the rest of the elements 20. In this way, it is possible to indicate, e.g., compression.

FIG. 3 shows an alternatively constructed press fitting 10', wherein those elements that correspond to or are structurally identical to the elements of the press fittings 10 according to FIGS. 1 and 2 are provided with identical reference symbols.

In the case of the embodiment according to FIG. 3, the press fitting 10' has, in addition to at least one locking/spacer element 20, as described above in connection with FIGS. 1 and 2, at least one element 42 that is used exclusively for maintaining the spacing and that projects into the annular space 22 at the holding end 35 of the pressing sleeve 18. This spacer element 42 can involve a separate element or a holding element 42 constructed integrally with the pressing sleeve 18, as shown in this embodiment in FIG. 3. The spacer element 42 is constructed as a corrugation-shaped recess 44 of the pressing sleeve 18 that is produced by deformation of the walls 34 of the pressing sleeve 18. The corrugation-shaped recess 44 contacts the supporting sleeve 14 on the outside and is thus used for maintaining the spacing. The press fitting 10' preferably has several locking/spacer elements 20 and/or several spacer elements 42 that perform only the spacer function and that are arranged offset relative to each other in the circumferential direction.

The invention claimed is:

1. Press fitting for a pipe, with
   a fitting body that has a supporting sleeve with a free end over which one end of a pipe to be connected can be pushed onto the supporting sleeve, and
   a pressing sleeve including cylindrical walls, the pressing sleeve being plastically deformable for pressing against one end of a pipe pushed onto the supporting sleeve and that has an axial holding end, turned away from the free end of the supporting sleeve, at which the pressing sleeve is held on the fitting body,
wherein
   the pressing sleeve is held essentially concentric to the supporting sleeve by means of at least one spacer element arranged at the holding end of the pressing sleeve,
   the fitting body has, in the area of the holding end of the pressing sleeve, a circumferential rib, and
   the cylindrical walls of the pressing sleeve have, at the holding end, at least one opening through which a locking element extends for engaging the circumferential rib of the fitting body for axial fixation of the pressing sleeve on the fitting body.

* * * * *